United States Patent
Lee et al.

(10) Patent No.: US 8,793,716 B2
(45) Date of Patent: Jul. 29, 2014

(54) CHANNEL CONTROL APPARATUS AND METHOD OF PRE-JOINING CHANNELS USING THE SAME

(75) Inventors: Kang-Yong Lee, Daejeon-si (KR); Kee-Seong Cho, Daejeon-si (KR); Won Ryu, Daejeon-si (KR)

(73) Assignee: Electronics and Telecommunications Research Institute, Daejeon-Si (KR)

( * ) Notice: Subject to any disclaimer, the term of this patent is extended or adjusted under 35 U.S.C. 154(b) by 453 days.

(21) Appl. No.: 12/882,397

(22) Filed: Sep. 15, 2010

(65) Prior Publication Data

US 2011/0145851 A1    Jun. 16, 2011

(30) Foreign Application Priority Data

Dec. 10, 2009    (KR) .................... 10-2009-0122646

(51) Int. Cl.
*H04H 60/32* (2008.01)
*H04N 7/16* (2011.01)
*H04L 12/24* (2006.01)
*H04N 21/418* (2011.01)
*H04H 60/43* (2008.01)
*H04H 60/46* (2008.01)

(52) U.S. Cl.
CPC ........ *H04L 12/2439* (2013.01); *H04N 21/4182* (2013.01); *H04H 60/43* (2013.01); *H04H 60/46* (2013.01)
USPC .................... 725/14; 725/46; 725/95

(58) Field of Classification Search
CPC .................................. H04L 12/2439
See application file for complete search history.

(56) References Cited

U.S. PATENT DOCUMENTS

| | | | | |
|---|---|---|---|---|
| 2008/0229379 A1* | 9/2008 | Akhter | .......................... | 725/139 |
| 2008/0244665 A1* | 10/2008 | Bowen et al. | ................... | 725/83 |
| 2009/0063983 A1* | 3/2009 | Amidon et al. | ............... | 715/733 |
| 2009/0328114 A1* | 12/2009 | Van Gassel et al. | ............ | 725/87 |
| 2010/0017815 A1* | 1/2010 | Mas Ivars et al. | .............. | 725/14 |

FOREIGN PATENT DOCUMENTS

KR    10-2008-0109232    12/2008

* cited by examiner

*Primary Examiner* — Kieu Oanh T Bui
(74) *Attorney, Agent, or Firm* — Kile Park Reed & Houtteman PLLC

(57) ABSTRACT

A channel control apparatus for an Internet protocol television (IPTV) broadcasting service, which selects and pre-joins channels based on data regarding a channel zapping pattern of a user, thereby effectively reducing channel zapping time, and a method of pre-joining channels using the channel control apparatus are provided. The channel control apparatus comprises: a pattern information collection unit configured to collect data regarding a channel zapping pattern of a user for a cycle of a previously set period; a bandwidth management unit configured to set a pre-joining bandwidth, which is an allowable bandwidth for channels to be pre-joined, based on the collected data; a channel selection unit configured to select channels to be pre-joined according to channel preference of a user; and a channel pre-join unit configured to pre-join the channels selected by the channel selection unit within the set pre-joining bandwidth.

6 Claims, 7 Drawing Sheets

CHANNEL CONTROL APPARATUS AND METHOD OF PRE-JOINING CHANNELS USING THE SAME

CROSS-REFERENCE TO RELATED APPLICATION

This application claims the benefit under 35 U.S.C. §119(a) of Korean Patent Application No. 10-2009-0122646, filed on Dec. 10, 2009, the entire disclosure of which is incorporated herein by reference for all purposes.

BACKGROUND

1. Field

The following description relates to an apparatus for controlling channels of an Internet protocol television (IPTV) service by selecting and pre-joining channels based on data regarding a channel zapping pattern of a user, thereby efficiently reducing channel zapping time, and a method of pre-joining channels using the apparatus.

2. Description of the Related Art

In an Internet protocol television (IPTV) environment, a channel broadcasting service is provided in multicast, and IP multicast protocols such as protocol independent multicast (PIM), Internet group management protocol (IGMP) and the like are used between backbone of an IP network and an edge router.

In the IPTV channel broadcasting service, broadcast data is transmitted in multicast stream through a broadcast channel from a head end to a set-top box (STB). Here, a user may join a broadcast channel multicast group to receive the broadcast data.

Multicast is a transmission method in which data is replicated for simultaneous delivery to more than one destination, thereby reducing network bandwidth. In the IPTV broadcasting service, a streaming server of a head end that transmits a broadcast channel is a multicast source, and a set-top box that is willing to view the broadcast channel is a receiver. The multicast source transmits broadcast data through a broadcast channel to a multicast group address as a destination address, and a user that is willing to receive the transmitted broadcast data joins a multicast group of the corresponding broadcast channel and receives various contents.

In the IPTV broadcasting service, all nodes that respectively transmit, transfer, and receive broadcasting through the same broadcast channel on networks constitute a multicast group. Therefore, when a user issues a request for a channel to watch, a corresponding broadcast channel joins a multicast group.

According to a prior art, to reduce IPTV channel zapping time, not only a currently viewed channel but also adjoining channels are pre-joined based on characteristics of multicast. That is, in consideration of the fact that the user usually selects a channel by pressing up/down is buttons on a remote controller, data of channels to be next selected is transferred to a home gateway in advance.

However, if the user changes the channel using buttons other than the up/down buttons (a preset button or number buttons), channel zapping time reduction cannot be achieved. Moreover, in the above method, because several adjacent channels of a current viewed channel are additionally joined, multicast traffic of the corresponding adjacent channels is additionally transmitted to the home gateway, and thus network resource cost increases.

To overcome the above mentioned drawbacks, a method of providing an expected channel list based on the rating statistics obtained by a rating server has been proposed. However, although in some circumstance, the pre-joining through the rating server can advantageously pre-join fewer channels than the method of pre-joining adjoining channels and network resource cost can be reduced, the pre-joining through the rating sever may be less meaningful to a user because the rating server does not reflect their personally preferred channels.

Hence, a need for more efficiently improving channel zapping time has arisen.

SUMMARY

In one general aspect, provided is an apparatus for controlling a channel for an Internet protocol television (IPTV) service, the apparatus including: a pattern information collection unit configured to collect data regarding a channel zapping pattern of a user for a cycle of a previously set period; a bandwidth management unit configured to set a pre-joined channel bandwidth, which is an allowable bandwidth for channels to be pre-joined, based on the collected data; a channel selection unit configured to select channels to be pre-joined according to channel preference of a user; and a channel pre-join unit configured to pre-join the channels selected by the channel selection unit to the extent within the set pre-joining bandwidth.

In another general aspect, provided is a method of pre-joining channels for an Internet protocol television (IPTV) broadcasting service, the method including: collecting, at a pattern information collection unit, data regarding a channel zapping pattern of a user for a cycle of a previously set period; setting, at a bandwidth management unit, a pre-joining bandwidth, which is an allowable bandwidth for channels to be pre-joined, based on the collected data; selecting, at a channel selection unit, channels to be pre-joined according to channel preference of a user; and pre-joining, at a channel pre-join unit, the channels selected by the channel selection unit within the set pre-joining bandwidth.

Other features and aspects will be apparent from the following detailed description, the drawings, and the claims.

Figure 1:
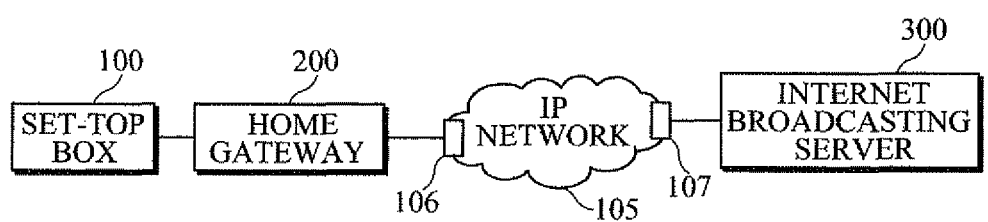
FIG. 1 is a diagram illustrating an example of an Internet protocol television (IPTV) service system.

Throughout the drawings and the detailed description, unless otherwise described, the same drawing reference numerals will be understood to refer to the same elements, features, and is structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an Internet protocol television (IPTV) service system. Referring to FIG. 1, the IPTV service system includes a set-top box 100, a home gateway 200, a plurality of routers 106 and 107, an Internet protocol (IP) network 105, and an Internet broadcasting server 300. As shown in FIG. 1, the set-top box 100 registers a multicast address of a channel to be viewed in the router 106 of the IP network through the home gateway 200 by the use of Internet group management protocol (IGMP). Each router 106 and 107 transmits broadcasting data, which is received from the Internet broadcasting server 300 through multicasting routing, to the home gateway 200. Through the above procedures, the broadcasting data is transmitted to the user from the Internet broadcasting server 300.

In one example, the set-top box 100 determines candidate channels to be pre-joined through collecting data regarding an IPTV view pattern of a user, calculating pre-joining bandwidth, and obtaining channel preferences, and pre-registers the determined candidate channels in the router 106, which will be described later.

The Internet broadcasting server 300 that provides the IPTV service transmits is broadcasting data of the pre-registered channels to the router 106 in advance. If a channel chosen by a user is one of the pre-joined channels, the router 106 transmits corresponding broadcasting data to the set-top box 100.

The above method of determining candidate channels to be pre-joined may effectively reduce channel zapping time, and hereinafter, the method will be described in further detail.

Figure 2:
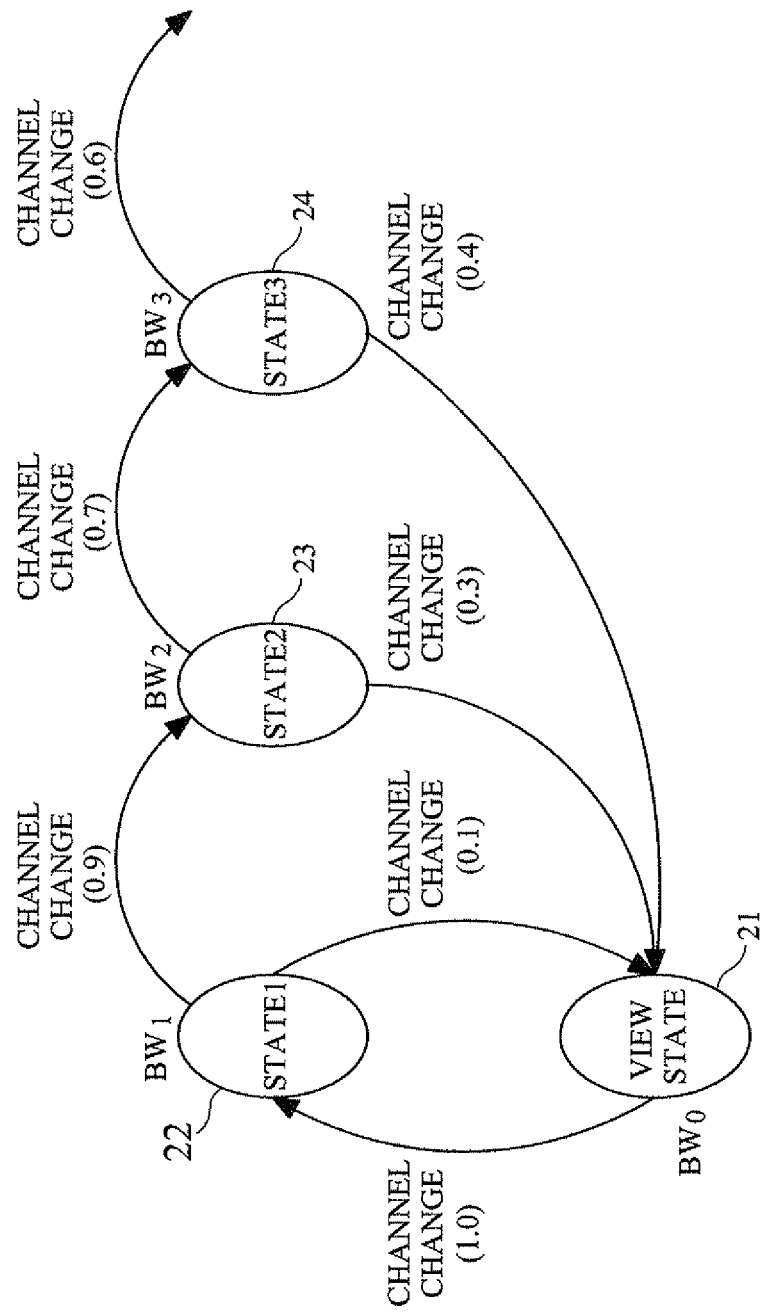
FIG. 2 is a diagram illustrating an example of a channel zapping pattern of a user.

FIG. 2 illustrates an example of a channel zapping pattern of a user. As shown in FIG. 2, a state in the channel zapping pattern represents the number of channel changes, and numbers in parentheses denote the probability of state change. $BW_i$ denotes the amount of bandwidth of a pre-joined channel in a state i.

In the example illustrated in FIG. 2, state 2 23 indicates that a user has changed the channel twice before deciding on a channel to watch and the user may has a probability of 0.7 of changing the channel again (in this case, the state is changed to state 3 24) or and a probability of 0.3 of watching the decided channel (in this case, the state is changed to view state 21). In view state 21, the user is watching the channel after making decision.

Thus, if the user changes the channel twice for browsing and decides on a channel to watch, state transit is performed in the order of view state 21, state 1 22, state 2 23, and view state 21. In this case, an initial state is view state 21.

In one example, data regarding an IPTV view pattern of a user may be collected for a predetermined period of time, pre-joining bandwidth may be calculated, and then candidate channels to be pre-joined may be determined. Hereinafter, the above procedures will be described in detail with reference to FIG. 3 in conjunction with the channel zapping pattern in the example illustrated in FIG. 2.

Figure 3:
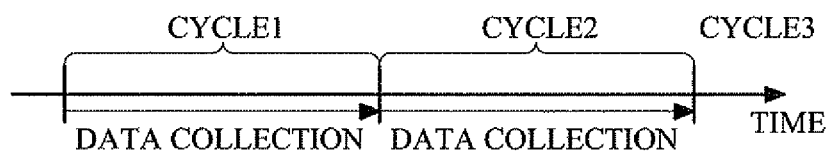
FIG. 3 is a diagram illustrating an example of how to collect data regarding an IPTV view pattern of a user for a certain period of time.

FIG. 3 illustrates an example of how to collect data regarding an IPTV view pattern of a is user for a certain period of time.

As shown in FIG. 3, the data of the IPTV view pattern of a user is collected for a previously set duration of time (or cycle) and at the end of the time duration or cycle, policies for channels to be pre-joined which will be in use later for the pre-join may be determined based on the collected data. The data to be collected may include the number of channel changes, average channel zapping time, average channel browsing time, average channel viewing time, and the number of uses of buttons of a remote controller. The period of time or cycle may be set manually by the user or manufacturer.

For example, at cycle 1, data collection is performed and a policy for a channel to be pre-joined is determined based on the collected data, and at cycle 2, data collection is performed and a policy for a channel to be pre-joined is determined based on the collected data in the same manner as at cycle 1. Hereinafter, data to be collected will be described in detail.

First, the number $C_i$ of channel changes (see FIG. 4) indicates the number of channel changes until a final channel selection is performed in the course of channel browsing. That is, the number $C_i$ of entering each state i is calculated in the channel zapping pattern illustrated in FIG. 2. For example, if a channel to watch is finally selected after changing the channel twice, each of state 1, state 2, and view state is counted once. Here, the initial view state can be excluded from counting.

Thereafter, average channel zapping time $T_z$ (see FIG. 4) indicates delay time spent on changing the channel, and may be defined as Equation 1 below.

$$T_z = \text{(total channel zapping time generated during a set cycle)/(total number of channel changes)} \quad (1)$$

Then, average channel exploring time $T_{st}$ (see FIG. 4) indicates an average time for which channels are maintained in the course of channel browsing, and may be defined as Equation 2.

$$T_{st} = \text{(total channel browsing time generated during a set cycle)/(total number of channel changes)} \quad (2)$$

Average channel viewing time $T_{view}$ (see FIG. 4) indicates average viewing time of a channel after the channel is selected, and may be defined as Equation 3 below.

$$T_{view} \text{(total channel viewing time generated during a set cycle)/(total number of channel changes)} \quad (3)$$

The number of uses of a button of a remote controller indicates the number of times a button of a remote controller is selected during a set cycle. The button of the remote controller may be a random button, an up button, a down button, or a toggle button. The random button is a button of a channel number that is known to the user and directly pressed by the user.

Procedures of calculating the pre-joining bandwidth will be described.

The pre-joining bandwidth may be calculated at the end of each cycle during which data is collected. The pre-joining bandwidth is an allowable bandwidth for channels to be pre-joined, and thus the number of channels which can be pre-joined increases as the bandwidth increases. In contrast, the number of channels which can be pre-joined is reduced as the bandwidth decreases.

That is, if the possibility (or probability) of a user changing the channel is greater than a set reference value, a wider pre-joining bandwidth is allocated, so that a large number of channels can be pre-joined, and accordingly, the accuracy rate is increased to reduce channel zapping time.

In contrast, if the possibility of a user changing the channel is low, a narrow pre-joining bandwidth is allocated, thereby maximizing the efficiency of use of network resources.

In addition, if the channel zapping time of a previous cycle does not satisfy the user's demand, additional pre-joining bandwidth may be correspondingly allocated. In this case, the is user clicks a particular button to instruct the additional allocation of the pre-joining bandwidth. Through the above operation, the accuracy rate of a channel to which the user will change later can be increased and the channel zapping time can be reduced, thereby increasing the user satisfaction.

The above pre-joining bandwidth may be defined as Equation 4 below.

$$BW_i=(BW_{th} \times P_{sw}+BW_{ad}) \times \beta \qquad (4)$$

Here, $BW_i$ represents a pre-joining bandwidth in consideration of a channel change to be performed in state i. $BW_{th}$ represents a threshold channel bandwidth and $P_{sw}$ represents the probability of a channel change. In addition, $BW_{adj}$ represents an adjusted amount of bandwidth, which is determined in consideration of the average channel zapping time $T_z$. For example, if longer delay time is consumed in changing a channel, $BW_{adj}$ may be increased, and otherwise, $BW_{adj}$ may be decreased.

Furthermore, in Equation 4, β represents a weight coefficient to be used for initial channel zapping, and is determined based on the existing research that shows that a user usually changes channels between one and six times until he/she selects a channel. The research taken as reference is *Channel Selection Problem in Live IPTV Systems* by Cha, M. Y., Gunnadi, K. P. and Rodirguez, P. in Proc. of ACM SIGCOMM poster, August 2008.

In Equation 4, $P_{sw}$ indicates the probability of state i changing to state i+1, and it may be defined as Equation 5 below. Here, i>0, state 0=view state, $C_i$ represents the number of times state i is entered.

$$p_{sw} = \begin{cases} \dfrac{c_{i+1}}{c_i} \times \dfrac{T_{st}}{T_{view}} & (1) \\ \dfrac{c_{i+1}}{c_i} & (2) \end{cases} \qquad (5)$$

Here, in (1), if a user is watching a particular channel, the probability of channel change is low (that is, i=0) until a corresponding program is finished, and a ratio $T_{st}/T_{view}$ between the average channel viewing time $T_{view}$ and the average channel browsing time $T_{st}$ is multiplied to is obtain the probability $P_{sw}$ of channel change.

By contrast, in (2), if the user is continuously browsing channels, it is regarded that there is no difference between times spent on the channels, and thus the browsing time is not taken into consideration.

Figure 4:
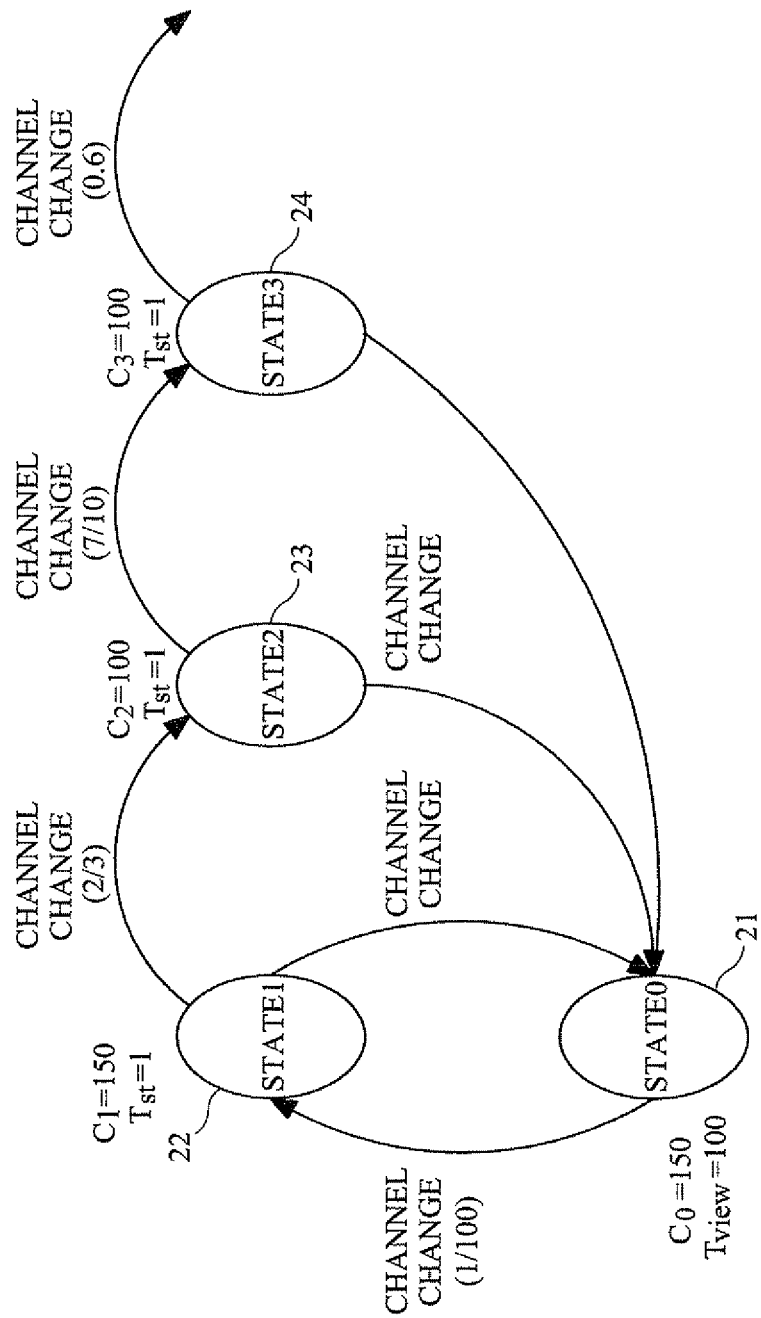
FIG. 4 is a diagram illustrating an example of how to calculate a pre-joining bandwidth.

FIG. 4 illustrates an example of how to calculate a pre-joining bandwidth. As shown in FIG. 4, if a user is watching a particular channel, the probability $P_{sw}$ of channel change is calculated by taking into consideration $T_{st}/T_{view}$ (that is, 1/100) because the numbers of times state 0 21 and state 1 22 are entered are set the same as each other (that is, $C_1=C_2=150$) in consideration of the event when the user changes the channel at some point, whereas times spent on the respective channels are different from each other. However, if it is assumed that the time spent on each channel is the same in the course of channel browsing, the ratio of entering each state is calculated as the probability of channel change.

In addition, if the average channel zapping time $T_z$ measured in a previous cycle is long, at the next cycle, more channels are pre-joined to increase an accuracy rate of pre-join, thereby increasing user satisfaction. Hence, if the average channel zapping time measured in the previous cycle does not meet the user's demand, as much bandwidth as the $BW_{adj}$ is allocated according to a request instruction from the user, and otherwise, the bandwidth is reduced by the amount as indicated by $BW_{adj}$. Accordingly, the pre-joining bandwidth can be adjusted.

If the number of channel changes ranges from one to six, to allocate a wider bandwidth than a bandwidth of the seventh-changed channel, β function may be defined as Equation 6 below.

$$\beta_i = 2 \times \frac{(M-i)^2}{M^2} \qquad (6)$$

Here, M denotes the maximum number of channel changes, and is set as 20. i denotes the number of channel changes.

Figure 5:
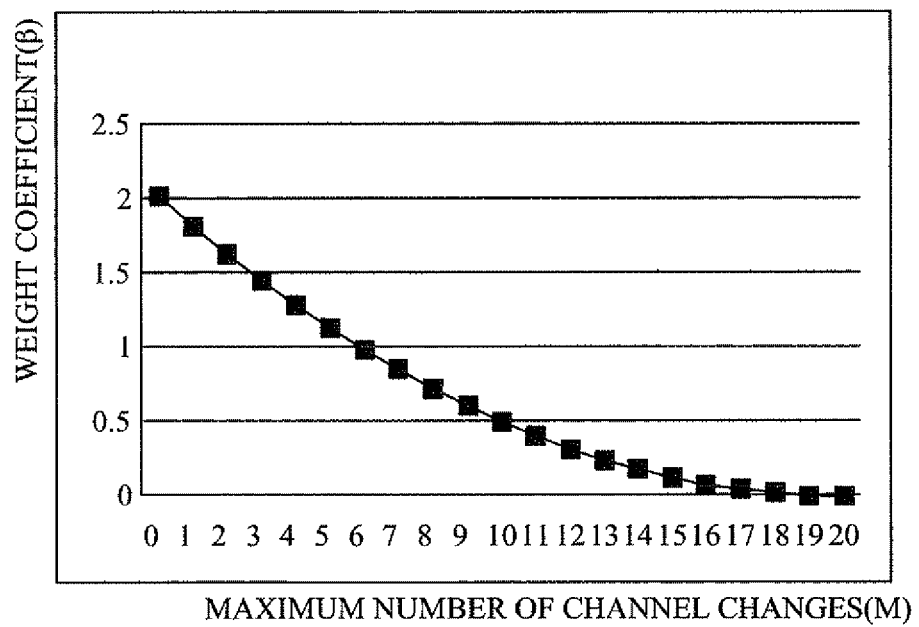
FIG. 5 is a graph of weight coefficient $\beta$ function according to the number of channel changes.
Figure 6:
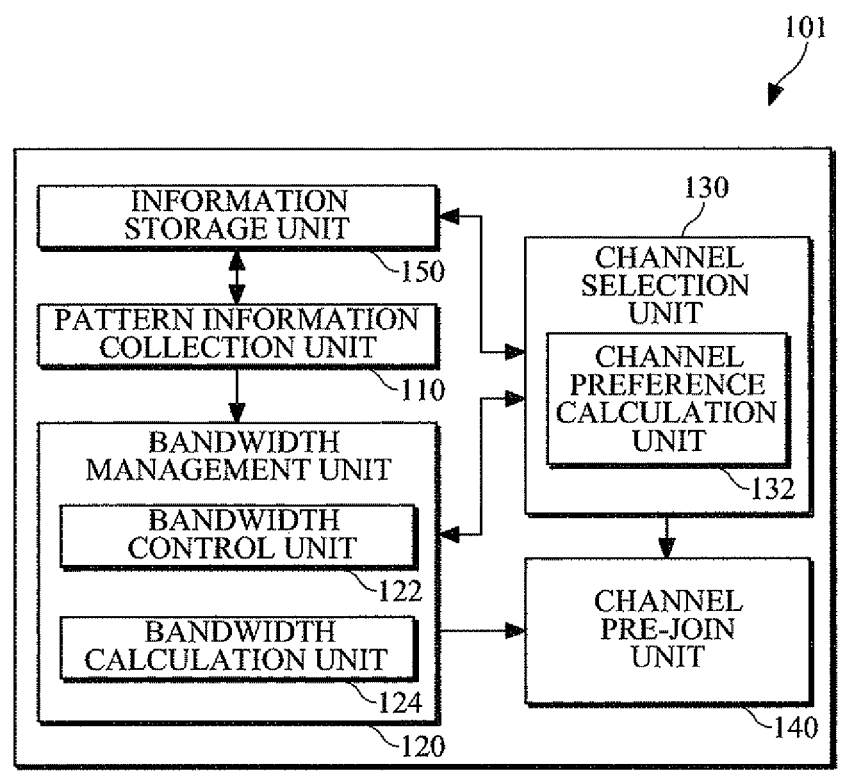
FIG. 6 is a diagram illustrating an example of a channel control apparatus.

In Equation 6, a graph of β function may be illustrated as shown in FIG. 6 based on the probability of channel change. That is, as the number of channel changes increases as shown in FIG. 5, the weight coefficient β decreases. As the weight coefficient β decreases, the pre-determined channel bandwidth for pre-joining is reduced.

Hereinafter, the procedure of determining candidate channels to be pre-joined will be described.

After the pre-joining bandwidth is calculated, channels to be pre-joined are determined corresponding to the calculated bandwidth. Hereinafter, such channels to be determined will be referred to as pre-joining candidate channels.

Channel preference is determined based on a program rating and a pattern of use of remote controller buttons. The channel preference is used to determine the pre-joining candidate channels, and it may be defined as Equation 7 below.

$$\pi_i = \alpha \cdot P_i + \beta \cdot x_{i-1} + \gamma \cdot x_{i+1} + \delta \cdot y_i \qquad (7)$$

Here, $\pi_i$ denotes the preference of channel i, and is obtained by taking into consideration the number of uses of a remote controller button (e.g. random, up, down, and toggle buttons). Weights α, β, γ, and δ are obtained as ratios between the total number of uses of all buttons, which is collected for the described-above channel zapping pattern and the respective numbers of uses of the buttons including the random button, the up button, the down button, and the toggle button, and the sum of all weights is 1.

Variables $x_i$, $y_i$, and $P_i$, which are multiplied by the weights, indicate types of channels is that were selected at the previous state. $x_i$ is a binary variable which is either 1 or 0 and indicates that the channel i was selected at the previous state, and $y_i$ is a binary variable which is either 1 or 0 and indicates that a channel i was selected at a state before the previous state. $P_i$ indicates the rating of the program currently broadcast on the channel i.

The channel preference may be calculated using the above weights and variables. For example, if the user knows a channel number to watch and selects the channel by pressing a random button (in this case, α=1), the probability of selecting each channel is a program rating $P_i$ of each channel regardless of the type of the channel. However, if the user is watching channel 5 (in this case, $x_5=1$) currently while browsing channels using the up button (in this case, β=1), the probability of changing the channel to channel 6 is 1.

Thereafter, the pre-joining candidate channels are pre-joined in order of channel preference, and the pre-joining is performed until the sum of the channel bandwidths reaches the above-described pre-joining bandwidth.

FIG. 6 illustrates an example of a channel control apparatus.

As shown in FIG. 6, the channel control apparatus 101 includes a pattern information collection unit 110, a bandwidth management unit 120, a channel selection unit 130, a channel pre-join unit 140, and an information storage unit 150. The channel control apparatus 101 may be implemented inside a set-top box.

The pattern information collection unit 110 collects data regarding a channel zapping pattern of a user for cycle of a previously set period. The data regarding the channel zapping pattern may include the number of channel changes, average channel zapping time, average channel browsing time, average channel viewing time, and the number of uses of a button of a remote controller. The description of the above data has been provided with reference to FIGS. 2 and 3.

The bandwidth management unit 120 sets an allowable bandwidth for channels to be pre-joined, that is, pre-joining bandwidth, based on the data collected by the pattern information collection unit 110. The bandwidth management unit 120 may include a bandwidth control unit 122 and a bandwidth calculation unit 124.

The bandwidth control unit 122 allocates a wide pre-joining bandwidth when a comparison result shows that the probability (possibility) of channel change is greater than a previously set reference value, thereby increasing the number of channels to be pre-joined. Otherwise, the bandwidth control unit 122 allocates a narrow pre-joining bandwidth, thereby reducing the number of channels to be pre-joined.

The bandwidth calculation unit 124 calculates the probability of channel change using a ratio between the average channel browsing time and the average channel viewing time when the user is watching a particular program, and calculates the probability of channel change without considering the average channel browsing time and the average channel viewing time when the user is browsing channels. Then, the bandwidth calculation unit 124 applies the calculated probability of channel change to Equation 4 to obtain the pre-joining bandwidth. In this case, it is noted that as the probability of channel change is increased in Equation 4, the pre-joining bandwidth increases, and as the probability is decreased, the pre-joining bandwidth is reduced.

The channel selection unit 130 selects channels to be pre-joined according to the channel preference. The channel selection unit 130 may include a channel preference calculation unit 132. The channel preference calculation unit 132 calculates the channel preference using a program rating and a pattern of use of a remote controller button. The channel preference used for determining the pre-joining candidate channels may be defined as Equation 7 described above.

The channel pre-join unit 140 performs pre-joining of the channels selected by the channel selection unit 130 within the pre-joining bandwidth. As described above, the pre-joining of the pre-joining candidate channels is performed in order of channel preference until the sum of the bandwidths of the pre-joined channels reaches the pre-joining bandwidth calculated by the bandwidth calculation unit 124.

The information storage unit 150 stores the pre-joined channels and bandwidths of the channels, various setting values, signal information of a selected button of a remote controller, information of a currently watched broadcasting program, channel zapping information, and algorithms, programs and different data for executing an operation related to the above-described examples.

The information storage unit 150 may be implemented as a non-volatile memory element such as a cache, a read only memory (ROM), a programmable ROM (PROM), an erasable PROM (EPROM), an electrically erasable PROM (EEPROM) and flash memory, a volatile memory element such as a random access memory (RAM), or a storage medium such as a hard disk drive (HDD) and a CD-ROM.

Figure 7:
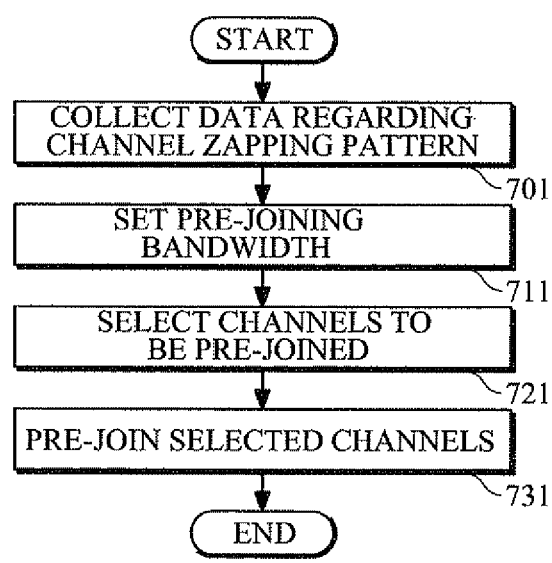
FIG. 7 is a flowchart illustrating an example of a method of pre-joining a channel.

FIG. 7 illustrates a flowchart of an example of a method of pre-joining a channel.

As shown in FIGS. 6 and 7, first, for an IPTV channel broadcasting service, the pattern information collection unit 110 (see FIG. 6) collects data regarding a channel zapping pattern of a user for a cycle of a previously set period (701). Here, the data to be collected includes the number of channel changes, average channel zapping time, average channel browsing time, average channel viewing time, and the number of uses of a button of a remote controller.

Then, the bandwidth management unit 120 (see FIG. 6) sets a pre-joining bandwidth that is an allowable bandwidth for channels to be pre-joined based on the collected data (711). The bandwidth management unit 120 allocates a wide pre-joining bandwidth when a comparison is result shows that the probability (possibility) of channel change is greater than a previously set reference value, thereby increasing the number of channels to be pre-joined. Otherwise, the bandwidth management unit 120 allocates a narrow pre-joining bandwidth, thereby reducing the number of channels to be pre-joined.

In addition, the bandwidth management unit 120 calculates the probability of channel change using a ratio between the average channel browsing time and the average channel viewing time when the user is watching a particular program, and calculates the probability of channel change without considering the average channel browsing time and the average channel viewing time when the user is browsing channels.

Thereafter, the channel selection unit 130 (see FIG. 6) selects channels to be pre-joined according to channel preference of the user (721). Here, the channel preference may be calculated using a program rating and a pattern of use of a remote controller button.

Then, the channel pre-join unit 140 (see FIG. 6) pre-joins the channels selected by the channel selection unit 130 within the pre-joining bandwidth (731).

Each element in the example illustrated in FIG. 6 may be implemented as a module. The module refers to a hardware element such as field programmable gate array (FPGA) and application specific integrated circuit (ASIC), and performs a specific function. However, the module does not refer to only a software or hardware element. The module may be configured to be present in a storage medium or to run one or more processors. The functions of the elements and modules may be combined, or may be divided into additional elements and modules.

As described above, a user is allowed to select and pre-join channels based on data regarding a channel zapping pattern of the user, and thus channel zapping time can be reduced is effectively.

In the above examples, a rating of a program broadcast on a current channel and the number of uses of a remote controller button are used to calculate channel preference, channels are selected according to the channel preference and the selected channels are pre-joined to the extent within previously calculated pre-joining bandwidth, so that the channel zapping time can be reduced and user satisfaction can be increased.

Moreover, when the probability of channel change is high, a wide pre-joining bandwidth is allocated to increase the number of channels to be pre-joined, and when the probability of channel change is low, a narrow pre-joining bandwidth is allocated to reduce the number of channels to be pre-joined, thereby minimizing network resource waste and increasing the accuracy rate of a channel to be selected next. Accordingly, the channel zapping time can be reduced.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for controlling a channel for an Internet protocol television (IPTV) service, the apparatus comprising:
a pattern information collection unit configured to collect data regarding a channel zapping pattern of a user for a cycle of a previously set period;
a bandwidth management unit configured to set a pre-joining bandwidth, which is an allowable bandwidth for channels to be pre-joined, based on the collected data;
a channel selection unit configured to select channels to be pre-joined according to channel preference of a user; and
a channel pre-join unit configured to pre-join the channels selected by the channel selection unit within the set pre-joining bandwidth,
wherein the channel selection unit comprises a channel preference calculation unit that is configured to calculate the user's preference for a particular channel based on a rating of a program currently broadcast on the particular channel and the probability that the user will use a remote controller button that relates to the particular channel,
wherein the collected data includes at least one of the number of channel changes, average channel zapping time, average channel browsing time, average channel viewing time, or the number of uses of a button of a remote controller,
wherein the bandwidth management unit allocates additional pre-joining bandwidth if the channel zapping time of a previous cycle does not satisfy the user's demand.

2. The apparatus of claim 1, wherein the bandwidth management unit is further configured to include a bandwidth control unit configured to allocate a wide pre-joining bandwidth to increase the number of channels to be pre-joined when a comparison result shows that a probability of channel change by a user is greater than a set reference value, and to allocate a narrow pre-joining bandwidth to reduce the number of channels to be pre-joined when the comparison result shows that the probability of channel change by the user is lower than the set reference value.

3. The apparatus of claim 2, wherein the bandwidth management unit is further configured to include a bandwidth calculation unit configured to calculate the probability of channel change using a ratio between the average channel browsing time and the average channel viewing time when the user is watching a particular program, and calculate the probability of channel change without considering the average channel browsing time and the average channel viewing time when the user is browsing channels.

4. A method of pre-joining channels for an Internet protocol television (IPTV) broadcasting service, the method comprising:
collecting, at a pattern information collection unit, data regarding a channel zapping pattern of a user for a cycle of a previously set period;
setting, at a bandwidth management unit, a pre-joining bandwidth, which is an allowable bandwidth for channels to be pre-joined, based on the collected data;
selecting, at a channel selection unit, channels to be pre-joined according to channel preference of a user, wherein the user's preference for a particular channel is calculated based on a rating of a program currently broadcast on the particular channel and the probability that the user will use a remote controller button that relates to the particular channel; and
pre-joining, at a channel pre-join unit, the channels selected by the channel selection unit within the set pre-joining bandwidth,
wherein the collected data includes at least one of the number of channel changes, average channel zapping time, average channel browsing time, average channel viewing time, or the number of uses of a button of a remote controller,
allocating additional pre-joining bandwidth if the channel zapping time of a previous cycle does not satisfy the user's demand.

5. The method of claim 4, wherein the setting of the pre-joining bandwidth comprises allocating a wide pre-joining bandwidth to increase the number of channels to be pre-joined when a comparison result shows that a probability of channel change by a user is greater than a set reference value, and allocating a narrow pre-joining bandwidth to reduce the number of channels to be pre-joined when the comparison result shows that the probability of channel change by the user is lower than the set reference value.

6. The method of claim 5, wherein the setting of the pre-joining bandwidth further comprises calculating the probability of channel change using a ratio between the average channel browsing time and the average channel viewing time when the user is watching a particular program, and calculating the probability of channel change without considering the average channel browsing time and the average channel viewing time when the user is browsing channels.

* * * * *